Figure 1:
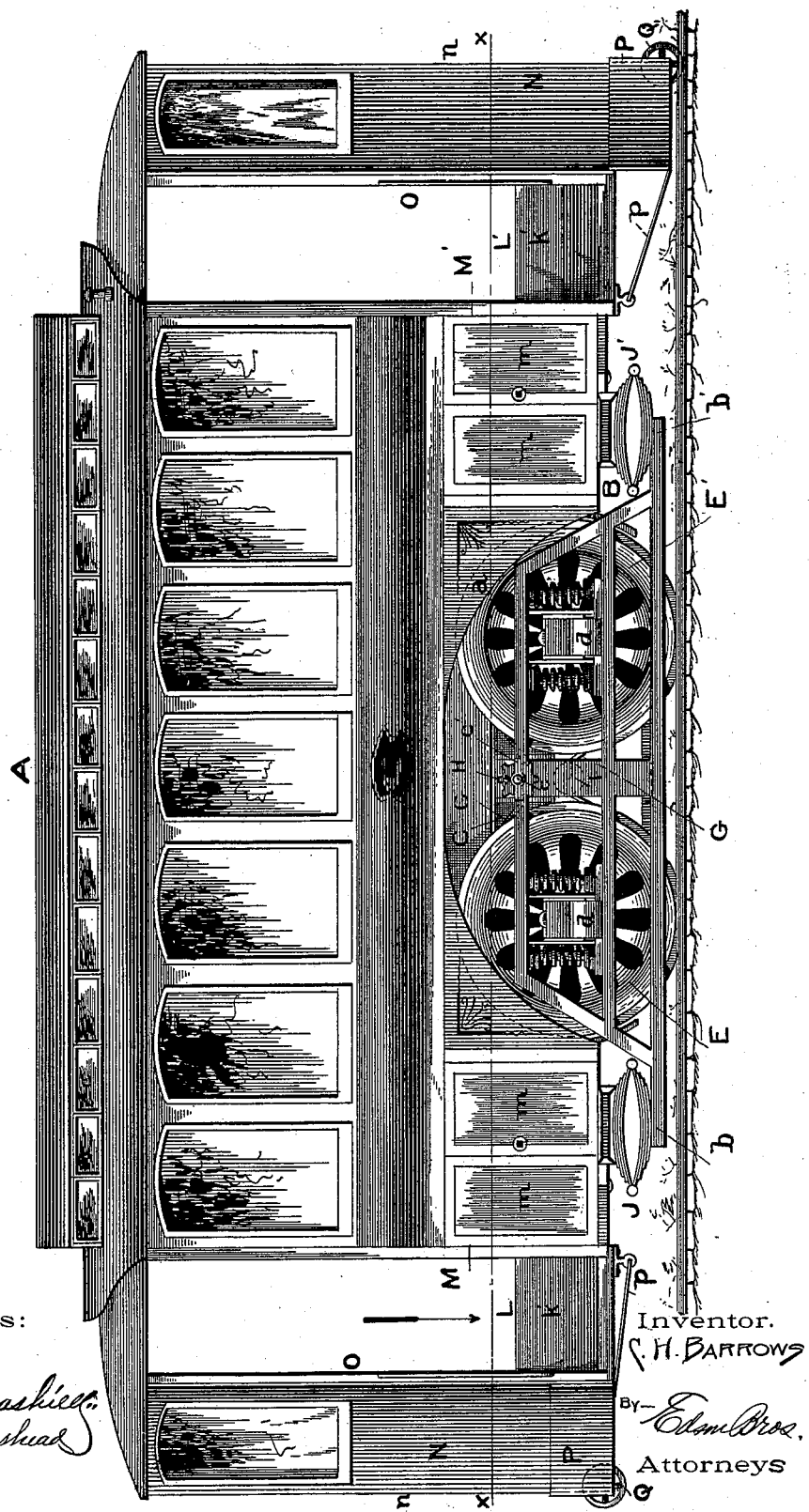

(No Model.)  
4 Sheets—Sheet 1.

C. H. BARROWS.
RAILWAY CAR.

No. 528,845. Patented Nov. 6, 1894.

Witnesses:  
Inventor.  
C. H. Barrows  
By— Attorneys (No Model.) 4 Sheets—Sheet 2.

C. H. BARROWS.
RAILWAY CAR.

No. 528,845. Patented Nov. 6, 1894.

Witnesses:

Inventor.
C. H. BARROWS.
BY Eden Bros,
Attorneys (No Model.)  
4 Sheets—Sheet 3.

C. H. BARROWS.
RAILWAY CAR.

No. 528,845.  Patented Nov. 6, 1894.

Witnesses.  Inventor.
C. H. BARROWS.
BY
Attorneys (No Model.) 4 Sheets—Sheet 4.
C. H. BARROWS.
RAILWAY CAR.
No. 528,845. Patented Nov. 6, 1894.
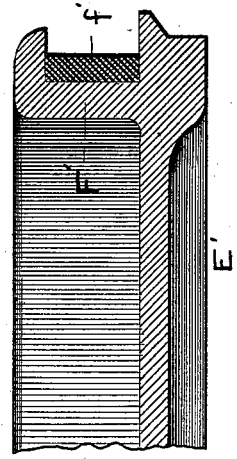
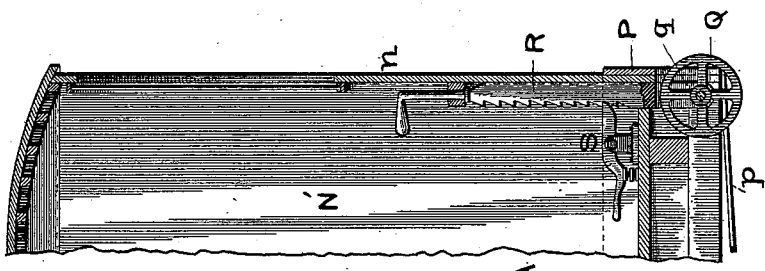
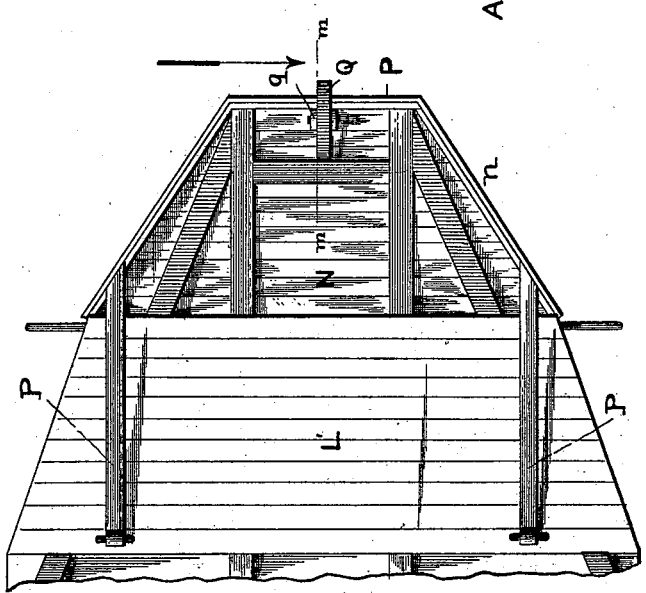
Witnesses:
Wm. O. Dashiell
T. N. Mothershead
Inventor.
C. H. Barrows.
By Edson Bros.
Attorneys

UNITED STATES PATENT OFFICE.

CHARLES H. BARROWS, OF WILLIMANTIC, CONNECTICUT.

RAILWAY-CAR.

SPECIFICATION forming part of Letters Patent No. 528,845, dated November 6, 1894.

Application filed February 9, 1894. Serial No. 499,608. (No model.)

*To all whom it may concern:*

Be it known that I, CHARLES H. BARROWS, a citizen of the United States, residing at Willimantic, in the county of Windham and State of Connecticut, have invented certain new and useful Improvements in Railway-Cars; and I do hereby declare the following to be a full, clear, and exact description of the invention, such as will enable others skilled in the art to which it appertains to make and use the same.

The nature of this invention is a railway car designed to be propelled by electric energy stored in secondary batteries which are carried by compartments provided in the body of the car, and the object I have in view is to construct the propelling mechanism in a manner to exert the required traction power for the propulsion of the car with a current from a comparatively light battery and thereby utilize the energy of the battery to the best advantage.

My car consists of a single truck which supports the motor and the traction wheels between the ends of the car body. The body is sustained upon the truck near its ends, and within said body are provided transverse compartments which are designed to receive the storage battery cells. The motor shaft is journaled about the middle of the truck frame, and on opposite sides of this motor shaft are disposed the two axles which lie parallel to the motor shaft and which are provided with the traction wheels. These traction wheels are geared directly to the motor shaft to be propelled directly therefrom. The gearing between the motor-shaft and the traction wheels may be of any conventional form, but I prefer to provide friction drums on the traction wheels and employ endless driving chains which pass continuously around the friction drums on two adjacent traction wheels. These driving chains are preferably in the form of sprocket chains and they engage with sprocket wheels fixed to the motor shaft. The sprocket chains pass underneath the propelling sprocket wheels to engage therewith, and the tension of these chains is regulated by means of an adjustable idler pulley which bears against the lower side of the chains and is supported in a suitable bearing or post fixed to the truck frame between the traction wheels and the friction drums thereof.

The car body mounted upon the truck frame as herein described overhangs the propelling mechanism at both ends, and the battery compartments are provided between the steps and the propelling mechanism, whereby the ends of the car body can be so constructed as to extend down close to the track and the steps arranged to enable the passengers to have easy access to or exit from the longitudinal compartment in the car body.

The invention further consists in the novel combination of devices and peculiar construction and arrangement of parts which will be hereinafter more fully described and particularly pointed out in the claims.

I have illustrated the preferred embodiment of my electrically propelled car in the accompanying drawings, forming a part of this specification, and in which—

Figure 2:
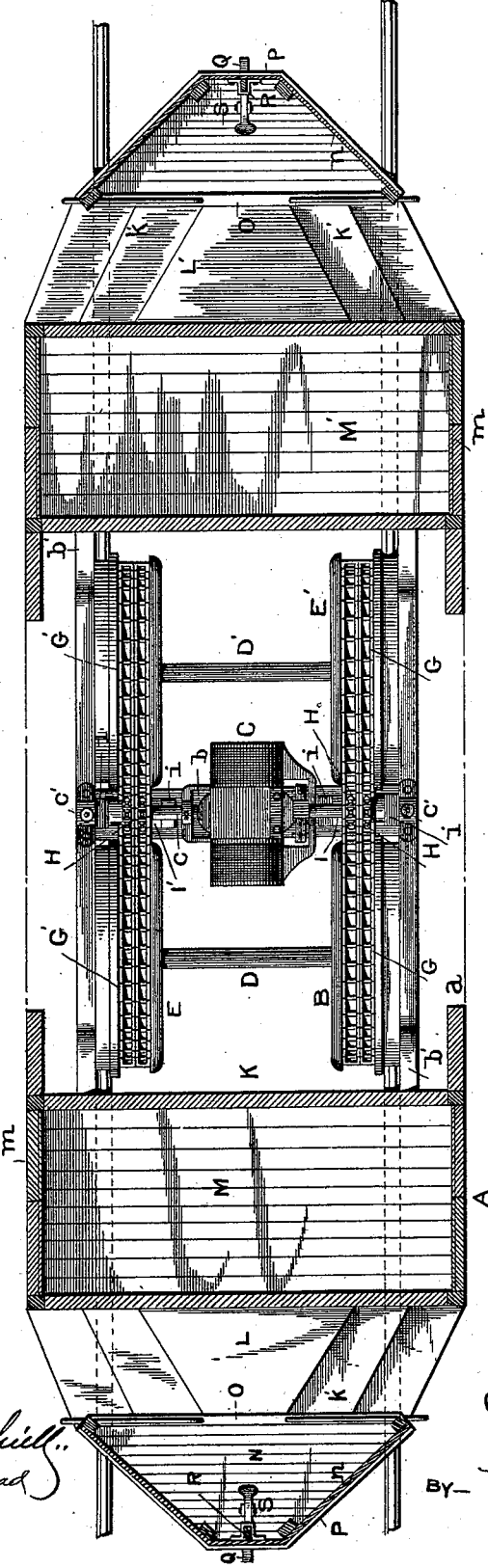
Figure 3:
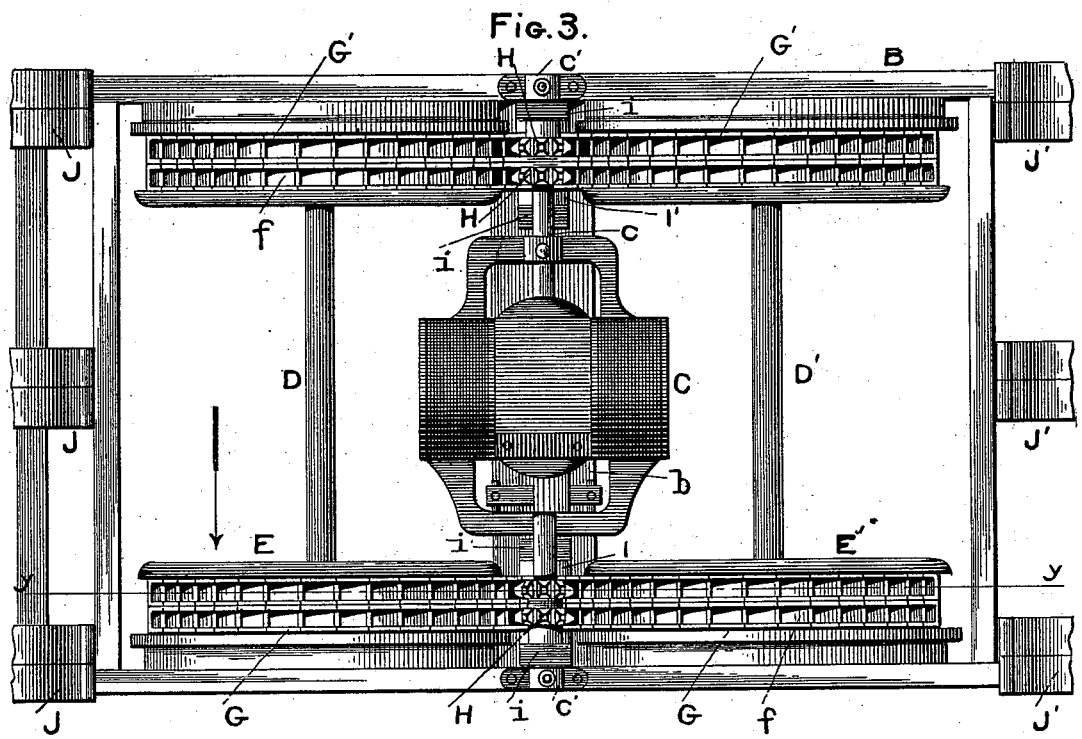
Figure 4:
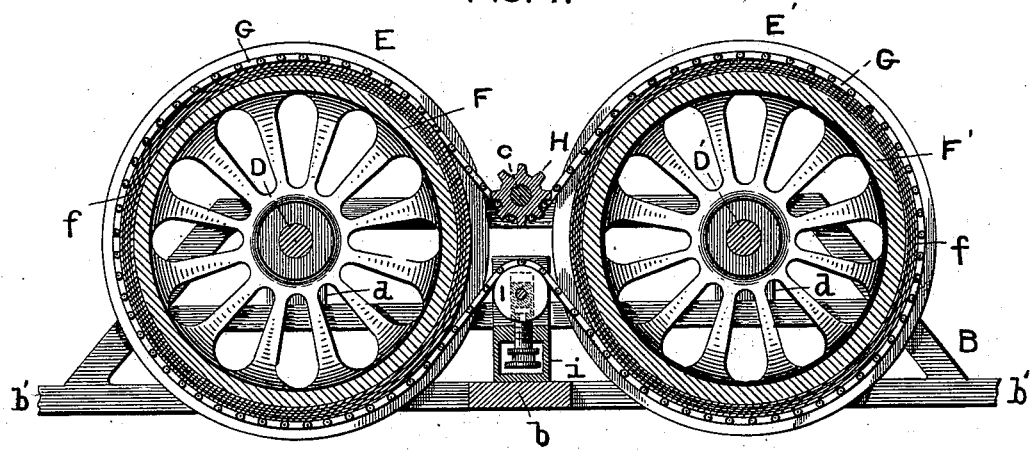

Figure 1 is a side elevation. Fig. 2 is a horizontal sectional view through the car on a plane below the seats in the passenger compartment, the section being taken on the line $x$—$x$ of Fig. 1. Fig. 3 is a plan view of the truck and propelling mechanism. Fig. 4 is a sectional view on the line $y$—$y$ of Fig. 3. Fig. 5 is a detail, bottom-plan view of one end of the car body illustrating the fender. Fig. 6 is a detail vertical sectional view on the line $m$—$m$ of Fig. 5. Fig. 7 is a detail, cross-sectional view through one of the traction wheels and its drum.

Like letters of reference denote corresponding parts in all the figures of the drawings, referring to which—

A designates the car body which is constructed to provide a housing or compartment, $a$, at the middle thereof, and in this central housing is placed the truck B, and the propelling mechanism, the latter being sustained wholly by the truck. This truck is constructed in any suitable way and with a transverse beam, $b$, upon which is mounted the electric motor C, the latter being disposed centrally with relation to the truck and between the sides thereof.

The armature of the motor is carried by a shaft, $c$, which extends transversely across from one side of the truck to the other and is journaled at its ends in the bearings, $c'$, which are fixed to the sides of the truck frame at the middle thereof.

On opposite sides of the motor are provided the axles D, D', the axes of which are parallel to the motor shaft $c$, and the ends of said axles being journaled in suitable bearings, $d$, rigidly supported on the truck frame. Each axle carries a pair of traction wheels, E, E', and the wheels on the adjacent axles are arranged in line with each other and on opposite sides of the shaft $c$ of the electric motor. These traction wheels are geared in any suitable way to the shaft of the motor to be driven directly therefrom, and in the same direction, and as the preferred embodiment of my invention, I provide the traction wheels with the friction drums, F, F', which are rigid with or suitably united to the inner faces of said traction wheels.

The friction drums on the pair of axle wheels on each side of the longitudinal axis of the car are in line with each other, as indicated by Figs. 2 and 3 of the drawings, and these aligned friction drums on each side of the car, are rotated by means of the endless sprocket chains, G, G', and the sprocket wheels, H, which are rigidly fastened to the motor shaft, $c$.

Immediately below the motor shaft, $c$, are erected the bearings or standards, $i, i$, which are fixed to the transverse beam, $b$, of the truck-frame, and in these bearings or standards are journaled the idler pulleys, I, I', over which pass the endless sprocket chains, G, G'. These idler pulleys, I, I', are adjustable in their bearings, $i$, in any suitable way, as shown by Fig. 4 of the drawings, whereby the slack in the sprocket chains can be taken up and the latter maintained under proper tension at all times. Each sprocket chain extends beneath its propelling sprocket wheel, thence around the friction drum, F, on one traction wheel, thence over the idler pulley I, and finally around the other friction drum, F', on the adjacent traction wheel. It will thus be seen that the sprocket chains are continuous and they extend around the aligned pair of friction drums to have the necessary contact therewith to rotate the traction wheels of the car; and by adjusting the idler pulleys, I, I', the tension of the endless chains and the frictional contact between the chains and the friction drums can be increased, as may be found necessary in practice. The friction drums are each provided with an annular groove in which is seated a yielding or elastic filling, $f$, which affords a soft bearing for the sprocket chains and increases the frictional contact between the drum and its driving chain.

The ends of the truck frame are projected or extended beyond the traction wheels, as indicated at $b'$, and on these extended ends are supported the springs, J, J', arranged in two sets at opposite ends of the truck frame. On these sets of springs, J, J', rest the car body. These springs may be of any suitable construction known to the art, and they are spaced at suitable intervals from each other, transversely across the truck and car body in order to sustain the latter in a balanced condition at opposite ends of the truck frame and give the body the necessary easy carriage or motion.

The body, A, may be constructed in any suitable way, and it is provided with a longitudinal compartment, K, for the accommodation of the passengers. Within this compartment, K, and on opposite sides thereof, are provided the seats, $k, k$, of the usual form. This compartment, K, opens at its ends upon the platforms, L, L', at opposite ends of the body, and from these platforms lead the steps, $k', k'$, by which access can be had to the compartment K.

At the ends of the longitudinal passenger compartment, K, and below the floor thereof, are constructed the compartments, M, M', which extend transversely across the car body and between the steps and the central housing, $a$, for the truck and running gear of the car. These compartments, M, M', are designed to receive the storage or secondary batteries (not shown) which supply the energy for operating the motor, C, suitable conductors being provided for conveying the electric energy from the batteries to the motor, as will be readily understood. The battery compartments, M M', may open through one or both sides of the car-body, A, and the compartments are closed by double doors, $m$, of any preferred structure.

By constructing the car body to accommodate a single truck which sustains the propelling mechanism for the car, and with the compartments, M, M', transversely across the body A between the platforms and steps and the central housing, $a$, the ends of the car can be extended close down to the track to enable the passengers to readily pass from the street to or from the steps, $k'$, leading to the longitudinal compartment, K, and all of the parts of the car are compactly disposed so as to reduce the weight and expense of the car to a minimum.

At each end of the car body I provide the compartments indicated at N, N', for the accommodation of the motorman. These compartments, N, N', are erected beyond the landings or platforms, L, L', by which the passengers pass to or from the compartment, K, so that the motorman does not stand in the way of the passengers, which objection is one found in the ordinary street railway cars. The motorman's compartment is inclosed by the usual sloping front wall, $n$, which has the sides thereof converging toward the middle of the car, and this front wall is constructed with the windows by which the motorman is enabled to have the necessary outlook.

The space between the motorman's compartment and the platform or landings, L, L', may be railed off, at O, or the compartments, N, N' may be isolated from the platforms L, L' in any suitable way.

At each end of the car I provide the fender, P. This is preferably constructed of sheet metal to conform to the cross sectional contour of the compartment, N, N', upon which the fender is adapted to fit, and this fender is designed to be adjusted vertically so that it can be dropped below the end of the car to prevent the car from running over a person on the track. The fender is hung by means of the arms or links, $p$, which are attached at one end to the fender and pivoted at their other ends to the bottom of the car. When the fender is lowered, its upper edge laps over the vertical wall of the motorman's compartment, and it is sustained in this position by means of the caster wheel, Q, journaled in a suitable bracket or bearing, $q$, attached to the fender.

A stem or rod, R, extends vertically above the fender and through an opening in the floor of the motorman's compartment, and this stem and the fender are sustained in their elevated positions by means of a trip S, supported on the floor of the motorman's compartment in a position to be released by the foot, whereby the fender is allowed to drop by gravity when the trip is released from the vertical stem or rod and the fender is sustained in its lowered position by the links and its caster wheel. This vertical stem or rod may be extended up within convenient reach of the motorman, to enable the latter to conveniently lift the fender whenever desired, or, a lever may be connected to this stem or rod in position to be operated by the motorman.

The operation of my invention will be readily understood from the foregoing description taken in connection with the drawings.

I am aware that changes in the form and proportion of parts and details of construction of the devices herein shown and described as an embodiment of my invention can be made without departing from the spirit or sacrificing the advantages thereof, and I therefore reserve the right to make such changes and alterations as fairly fall within the scope of the same.

Having thus fully described my invention, what I claim as new, and desire to secure by Letters Patent, is—

1. In a railway car, a body having a longitudinal passenger-compartment and transverse, spaced, battery-compartments at or near the ends of said passenger-compartment and below the floor thereof, combined with a truck frame situated between said battery-compartments and having at its ends the bearings or cushions upon which rests the car body, the axles journaled in said truck frame, and a motor carried by the truck frame and geared with said axles, substantially as and for the purposes described.

2. A railway car consisting of a truck carrying a propelling mechanism, and a car body seated upon said truck on opposite sides of its transverse axis and provided with a longitudinal passenger compartment and with battery compartments below the floor of the passenger compartment and transversely of the car, substantially as and for the purpose described.

3. A railway car consisting of a truck carrying a propelling mechanism, and a car body sustained by cushions upon the ends of the truck and provided with transverse battery compartments below the floor of its passenger compartment and at the ends thereof, and with isolated compartments beyond the passenger compartment, for the purposes described, substantially as set forth.

4. In a railway car, a body constructed with a longitudinal passenger compartment, the isolated compartments N, N', at the ends of the body, the platforms and steps between the isolated end compartments and the longitudinal passenger compartment, and the transverse battery compartments below the floor of the passenger compartment, and at the ends thereof, in combination with a truck upon which said body is supported, and a propelling mechanism carried by said truck, substantially as and for the purposes described.

5. The combination with a body and a truck, of the axles journaled in the truck and provided with the traction wheels, a motor sustained by the truck and having its shaft journaled in the truck frame between the traction wheels, and gearing between the motor shaft and the traction wheels, substantially as and for the purposes described.

6. The combination with a truck, of a motor sustained thereon and having its armature shaft journaled on the sides of the truck frame, the axles journaled in the truck frame parallel to the motor shaft and on opposite sides thereof, the traction wheels rigid with said axles and arranged in pairs, and the gearing intermediate between the motor shaft and the traction wheels, substantially as and for the purposes described.

7. The combination of a truck frame, the motor having its shaft journaled in bearings on said truck frame, the axles disposed on opposite sides of the motor shaft and also journaled in bearings on the truck frame, the traction wheels fitted on said axles and provided with the lateral friction drums, the endless cables or chains engaging with the friction drums and with the driving pulleys or gears on the motor shaft, and the idle-drums I sustained by bearings on the truck frame below the motor shaft and adjustable vertically to bear against the endless chains or cables, substantially as and for the purposes described.

8. The combination of a truck-frame, a motor having its shaft journaled therein and provided near its ends with the driving pulleys or gears, the axles, the traction wheels provided on their inner sides with the friction drums, the endless cables or chains passing beneath the motor shaft and engaging with the drive gear or pulleys thereon and said chains or cables also passing around the friction drums of the traction wheels, and the vertically adjustable idler rollers sustained by the truck frame below the shaft and bearing upwardly against the endless chains or cables, substantially as and for the purposes described.

9. The combination of the truck-frame, the motor having its shaft journaled in bearings thereon, the axles, the traction wheels, the friction drums, the idler pulleys sustained by vertically adjustable bearings in the lower part of the truck frame and in substantially the vertical plane of the motor shaft, and the endless drive chains or cables engaging with the motor shaft and passing over the idler pulleys and around the friction drums, substantially as described.

In testimony whereof I affix my signature in presence of two witnesses.

CHARLES H. BARROWS.

Witnesses:
J. CALVIN BROWN,
EVERETT H. SCOTT.